United States Patent
Renke

(10) Patent No.: US 10,118,467 B2
(45) Date of Patent: Nov. 6, 2018

(54) LOCATING AND RETENTION PIN

(71) Applicant: GM GLOBAL TECHNOLOGY OPERATIONS LLC, Detroit, MI (US)

(72) Inventor: David T. Renke, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 2 days.

(21) Appl. No.: 15/460,807

(22) Filed: Mar. 16, 2017

(65) Prior Publication Data

US 2018/0264917 A1    Sep. 20, 2018

(51) Int. Cl.
| | |
|---|---|
| *B60J 1/00* | (2006.01) |
| *B60J 1/02* | (2006.01) |
| *B29C 65/48* | (2006.01) |
| *E06B 3/54* | (2006.01) |
| *B60J 1/18* | (2006.01) |
| *B29L 31/30* | (2006.01) |

(52) U.S. Cl.
CPC .............. *B60J 1/005* (2013.01); *B29C 65/48* (2013.01); *B60J 1/006* (2013.01); *E06B 3/5481* (2013.01); *B29L 2031/30* (2013.01); *B60J 1/02* (2013.01); *B60J 1/18* (2013.01)

(58) Field of Classification Search
CPC ..... B60J 1/005; B60J 1/006; B60J 1/02; B60J 1/18; B29L 2031/3041; B29L 2031/3052; E06B 3/5481
USPC ................................ 296/84.1, 90, 96.21, 191
See application file for complete search history.

(56) References Cited

U.S. PATENT DOCUMENTS

| | | | | | |
|---|---|---|---|---|---|
| 5,785,377 | A | * | 7/1998 | Itoh | B60J 1/005 296/146.15 |
| 6,378,931 | B1 | * | 4/2002 | Kolluri | B60J 1/006 296/146.15 |
| 9,850,929 | B2 | * | 12/2017 | Gonnet | F16B 5/065 |
| 2007/0063539 | A1 | * | 3/2007 | DiMario | B60J 1/006 296/146.15 |
| 2013/0086855 | A1 | * | 4/2013 | Grandgirard | B29C 45/14065 52/204.591 |
| 2013/0270868 | A1 | * | 10/2013 | Tejero Salinero | F16B 5/02 296/191 |
| 2017/0218990 | A1 | * | 8/2017 | Gonnet | B60J 1/006 |
| 2017/0327049 | A1 | * | 11/2017 | Tsumiyama | B60R 7/06 |

FOREIGN PATENT DOCUMENTS

| | | | | | |
|---|---|---|---|---|---|
| DE | 19649762 | | * | 6/1998 | ............. B60J 1/005 |
| WO | WO 2016/016564 | | * | 2/2016 | ............. B60J 1/006 |

OTHER PUBLICATIONS

Computer generated translation of DE 19649762 (Year: 1998).*

* cited by examiner

*Primary Examiner* — Gregory A Blankenship

(57) ABSTRACT

A method of assembly includes providing a panel. The method also includes providing a locating member with a first portion and a second portion, and securing the first portion to the panel. The second portion is releasably engaged with the first portion. The method additionally includes providing a component with an orifice for receiving a locating member, and disposing the second portion in the orifice to locate the panel in a desired position relative to the component. The method further includes securing the panel to the component, and disengaging the second portion from the first portion.

20 Claims, 4 Drawing Sheets

LOCATING AND RETENTION PIN

TECHNICAL FIELD

The present disclosure relates to a locating and retention pin. More particularly, the present disclosure relates to a vehicle assembly having a locating and retention pin for retaining a panel, such as a pane of glass, in a desired location.

INTRODUCTION

Locator pins may be used to aid assembly of a vehicle panel by locating and retaining the panel in a desired position during at least one assembly step. Vehicle panels refer to a variety of generally flat planar components, including automotive window glass. As an example, locator pins may be used to retain the panel in a desired position while an adhesive agent applied to the panel cures.

SUMMARY

A method of assembly according to the present disclosure includes providing a panel. The method also includes providing a locating member with a first portion and a second portion, and securing the first portion to the panel. The second portion is releasably engaged with the first portion. The method additionally includes providing a component with an orifice for receiving a locating member, and disposing the second portion in the orifice to locate the panel in a desired position relative to the component. The method further includes securing the panel to the component, and disengaging the second portion from the first portion.

In an exemplary embodiment, the panel includes a pane of window glass.

In an exemplary embodiment, the method additionally includes disposing an adhesive on the panel. In such an embodiment, securing the panel to the component includes curing the adhesive.

In an exemplary embodiment, the first portion has a first mechanical feature and the second portion has a second mechanical feature, with the second mechanical feature being engageable with the first mechanical feature to mechanically engage the second portion to the first portion. In such an embodiment, disengaging the second portion from the first portion includes mechanically disengaging the second feature from the first feature. In such an embodiment, the first mechanical feature may include a protrusion and the second mechanical feature may include a recess, with the protrusion being engageable with the recess. In such an embodiment, mechanically disengaging the second feature from the first feature includes disengaging the protrusion from the recess. The second portion may be an elongate portion with a long axis, and the recess may be oriented generally orthogonal to the long axis, and wherein disengaging the protrusion from the recess includes rotating the second portion relative to the first portion. In a variation, the first mechanical feature may include a recess and the second mechanical feature may include a protrusion, with the protrusion being engageable with the recess, and mechanically disengaging the second feature from the first feature may include disengaging the protrusion from the recess. In such a variation, the second portion may be an elongate portion having a long axis, the recess may be oriented generally orthogonal to the long axis, and disengaging the protrusion from the recess may include rotating the second portion relative to the first portion.

In an exemplary embodiment, the method additionally includes reusing the second portion by engaging the second portion to a subsequent first portion to define a subsequent locating member, which is couplable to a subsequent panel.

In an exemplary embodiment, the second portion has a first cross-sectional profile. In such an embodiment, disengaging the second portion from the first portion includes providing a tool with a socket having a second cross-sectional profile, inverse to the first cross-sectional profile, disposing the tool about the second portion, and applying a torque to the tool to rotate the second portion relative to the first portion.

In an exemplary embodiment, the method additionally includes disposing a cover on the orifice after the disengaging.

An assembly according to the present disclosure includes a component with a surface and a receiving orifice on the surface. The assembly additionally includes a panel disposed proximate the component. The assembly further includes a locating member. The locating member has a first portion and a second portion. The first portion is secured to the panel, and the second portion is disposed at least partially in the orifice. The first portion has a first mechanical feature, the second portion has a second mechanical feature, and the second mechanical feature is releasably engaged with the first mechanical feature.

In an exemplary embodiment, the panel includes a pane of window glass.

In an exemplary embodiment, the first mechanical feature includes a protrusion and the second mechanical feature includes a recess, with the protrusion being engaged with the recess. In such an embodiment, the second portion may be an elongate portion with a long axis, the recess may be oriented generally orthogonal to the long axis, and the second portion may be rotatable relative to the first portion to disengage the protrusion from the recess.

In an exemplary embodiment, the first mechanical feature includes a recess and the second mechanical feature includes a protrusion, with the protrusion being engaged with the recess. In such an embodiment, the second portion may be an elongate portion with a long axis, the recess may be oriented generally orthogonal to the long axis, and the second portion may be rotatable relative to the first portion to disengage the protrusion from the recess.

In an exemplary embodiment, the second portion includes at least one arm member for retaining the panel relative to the component.

In an exemplary embodiment, the first portion includes a generally planar base and the second portion is an elongate portion having a long axis, with the long axis being generally orthogonal to the base.

An automotive vehicle according to the present disclosure includes a frame for receiving window glass. The frame has a mating surface and a receiving orifice on the mating surface. The vehicle also includes a pane of window glass disposed proximate the frame. The vehicle additionally includes a locating pin. The locating pin has a first portion and a second portion. The first portion is secured to the pane of window glass. The second portion is disposed at least partially in the orifice. The first portion has a first mechanical feature and the second portion has a second mechanical feature. The second mechanical feature is releasably engaged with the first mechanical feature.

Embodiments according to the present disclosure provide a number of advantages. For example, a locating pin assembly according to the present disclosure may be used to temporarily retain a panel in place, and subsequently easily removed for aesthetic improvement without requiring additional trim components.

The above advantage and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the exemplary aspects of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
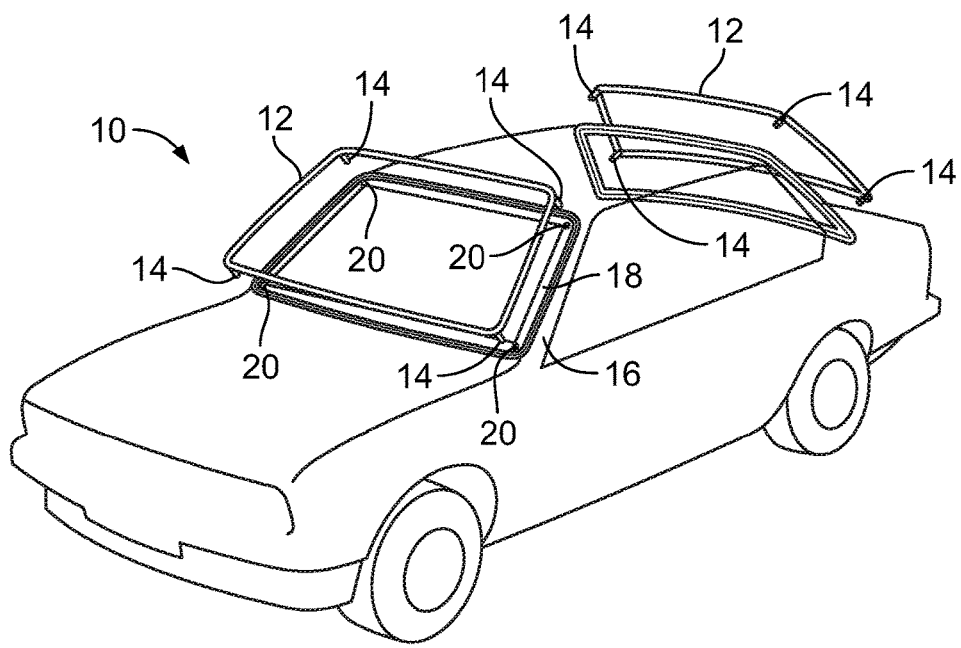
FIG. 1 is an isometric view of a vehicle assembly according to the present disclosure.

Referring now to FIG. 1, an automotive vehicle assembly 10 according to the present disclosure is illustrated. The vehicle assembly 10 includes at least one panel 12. In the embodiment of FIG. 1, the panels 12 include fixed sheets of window glass, e.g. a windshield and a rear window. In other embodiments, the at least one panel may include other sheets of fixed glass such as a fixed sunroof, or panels made of other materials such as plastics.

At least one locator pin 14 is associated with each panel 12. In the exemplary embodiment of FIG. 1, locator pins 14 are disposed at respective corners of each panel 12. However, in other embodiments, a different number of pins 14 may be provided, the location of the pins 14 may be other than as illustrated, or both. The configuration of the pins 14 will be discussed in further detail below.

The vehicle assembly 10 also includes at least one frame 16 having a mating surface 18. The mating surface 18 is shaped to interface with a corresponding surface of the panel 12. The mating surface 18 is provided with at least one orifice 20. The orifice or orifices 20 correspond in number, size, and location to the pin or pins 14, such that insertion of the pin or pins 14 into the corresponding orifice or orifices 20 aligns the panel 12 into a desired position relative to the frame 16. The panel 12 may thus be maintained in a desired position until secured to the mating surface 18, e.g. by curing an adhesive disposed between the panel 12 and the mating surface 18.

After the panel 12 has been secured to the mating surface 18, the pins 14 are not necessary for structural integrity of the vehicle assembly 10. In conventional assemblies, similar pins would be left in place after manufacture. This may result in undesirable aesthetic appearance in the final assembly, necessitate the inclusion of additional trim pieces to cover the pins, or both.

Figure 2A:
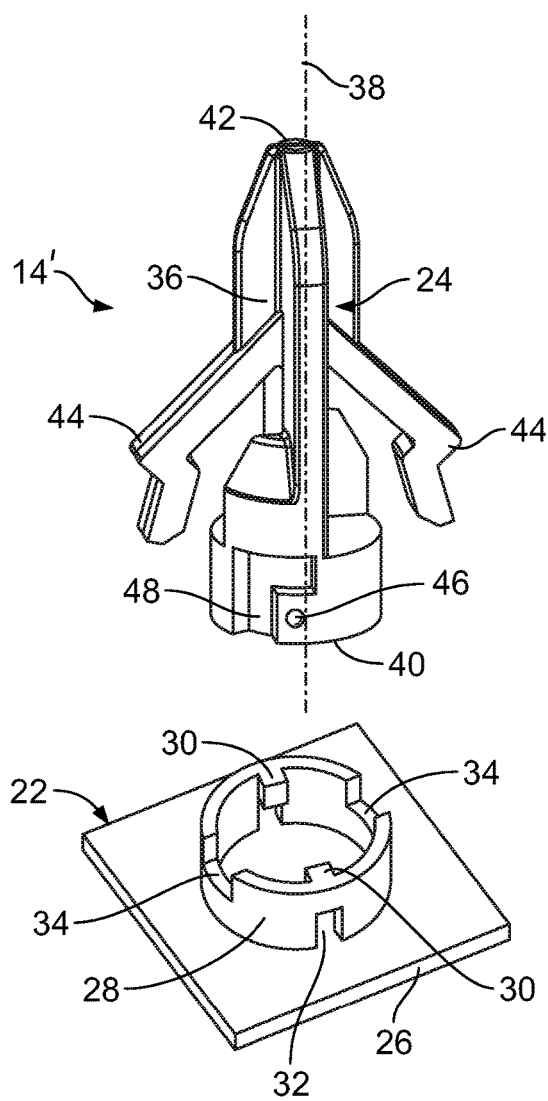
FIGS. 2A and 2B are isometric views of a pin assembly according to the present disclosure.
Figure 2B:
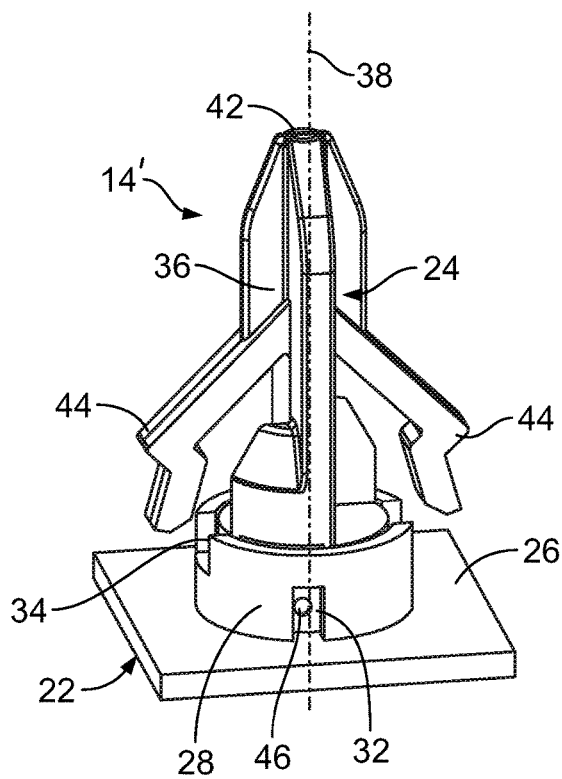

Referring now to FIGS. 2A and 2B, a pin assembly 14' according to the present disclosure is illustrated. The pin assembly 14' includes a base portion 22 and a pin portion 24. The base portion 22 and the pin portion 24 are distinct and separable pieces, as illustrated in FIG. 2A, but may be mechanically engaged with one another, as illustrated in FIG. 2B.

The base portion 22 has a mounting portion 26. The mounting portion 26 is adapted to be secured to a panel, e.g. as illustrated in FIG. 1. In the embodiment of FIGS. 2A and 2B the mounting portion is generally flat and planar. However, in other embodiments the mounting portion 26 may have other shapes, e.g. contoured to interface with a curved panel.

The base portion 22 also includes a receptor 28 for receiving the pin portion 24. In this embodiment, the receptor 28 is generally shaped as an annular cylinder. However, in other embodiments, the receptor 28 may take other shapes in correspondence with a shape of the pin portion 24. The receptor 28 is provided with at least one mechanical feature for engaging with the pin portion 24. In the embodiment of FIGS. 2A and 2B, the mechanical features include tabs 30 protruding from a sidewall of the receptor 28 toward the interior of the receptor 28, and additionally include notches 32 extending at least partially through the sidewall of the receptor 28. Additional notches 34 may also be provided to accommodate deflection of arm members of the pin portion 24, as will be discussed in further detail below.

The pin portion 24 includes an elongate body 36 extending along a central axis 38 from a proximal end 40 to a distal end 42. At least one resilient arm member 44 extends from the body 36 between the proximal end 40 and the distal end 42. The arm member or members 44 are configured to deflect toward the body 36 during insertion into an orifice, and to return to an undeflected position after insertion to thereby retain the pin portion in the orifice.

The proximal end 40 is provided with at least one mechanical feature for engaging with the base portion 22. In the embodiment of FIGS. 2A and 2B, the mechanical features include a detent 46 for engaging with the notches 32 of the base portion 22. In addition, the mechanical features include grooves 48 for engaging with the tabs 30 of the base portion 22. Each respective groove 48 has a first portion extending parallel to the central axis 38 and a second portion extending circumferentially about a portion of the body 36.

To engage the pin portion 24 and base portion 22, the tabs 30 of the base portion 22 are aligned with the grooves 48 of the pin portion 24. The pin portion 24 is inserted into the receptor 28 in a direction generally parallel to the central axis 38, and subsequently pivoted about the central axis 38 to engage the detent 46 of the pin portion 24 with the notches 32 of the base portion 22. The pin portion 24 is thereby engaged with the base portion 24, as illustrated in FIG. 2B.

For assembly of a panel to a frame, e.g. a pane of automotive glass to a vehicle frame, the mounting portion 26 may be secured to a panel such that the pin portion 24 protrudes from the panel in the fashion illustrated in FIG. 1. This may be performed by application of adhesive between the mounting portion 26 and the panel, or by other appropriate means as understood by one of ordinary skill in the art. In various embodiments, the pin portion 24 may be engaged with the base portion 22 before or after securing the mounting portion 26 to a panel.

In the embodiment illustrated in FIGS. 2A and 2B the receptor 28 is generally orthogonal to the mounting portion 26, such that the central axis 38 of the pin portion 24 will extend in a direction generally orthogonal to a surface of a panel to which the mounting portion 26 is secured. However, in other embodiments the receptor 28 may be canted at an angle relative to the mounting portion 26 such that the central axis 38 extends in a direction other than orthogonal to the surface of the panel.

Figure 3:
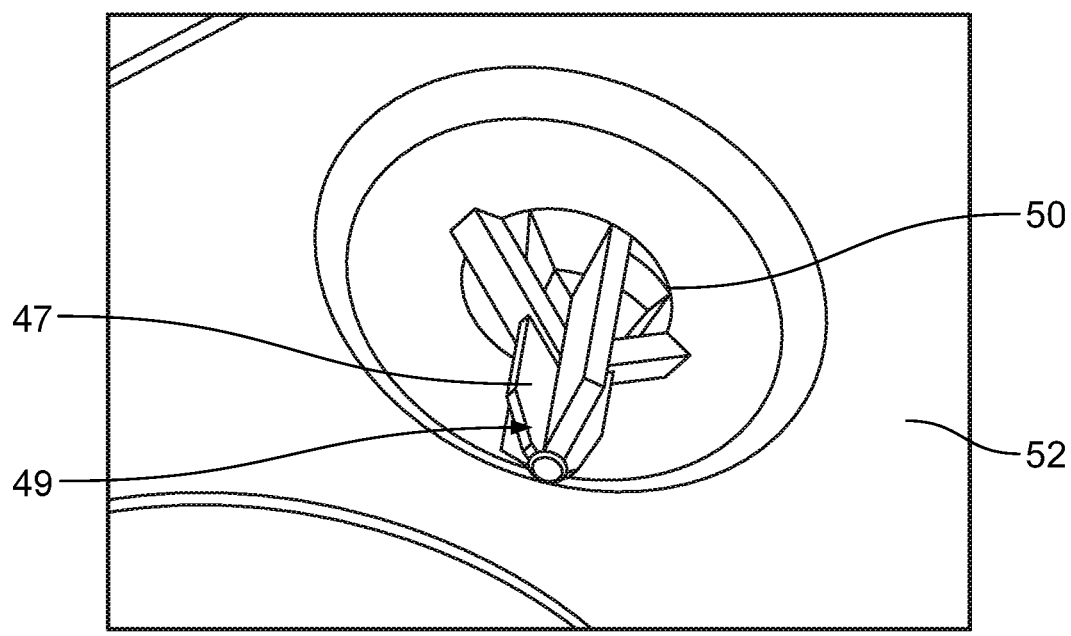
FIG. 3 is a view of a panel assembly according to the present disclosure.

Referring now to FIG. 3, a view of a panel assembly according to the present disclosure is shown. A pin portion 47 of a pin assembly 49, which is preferably configured generally similar to the pin assembly 14' of FIGS. 2A and 2B, is inserted into an orifice 50 of a mating surface 52. A base portion of the pin assembly 49, not shown in this view, is secured to a panel which is thereby retained against the mating surface 52.

Figure 4A:
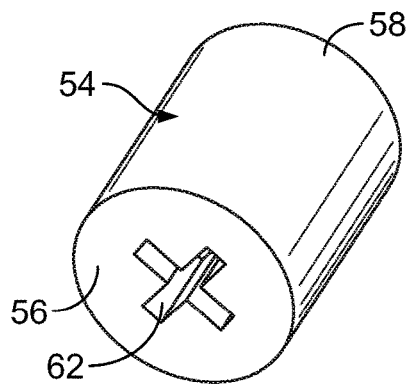
FIGS. 4A and 4B are views of a pin removal tool according to the present disclosure.
Figure 4B:
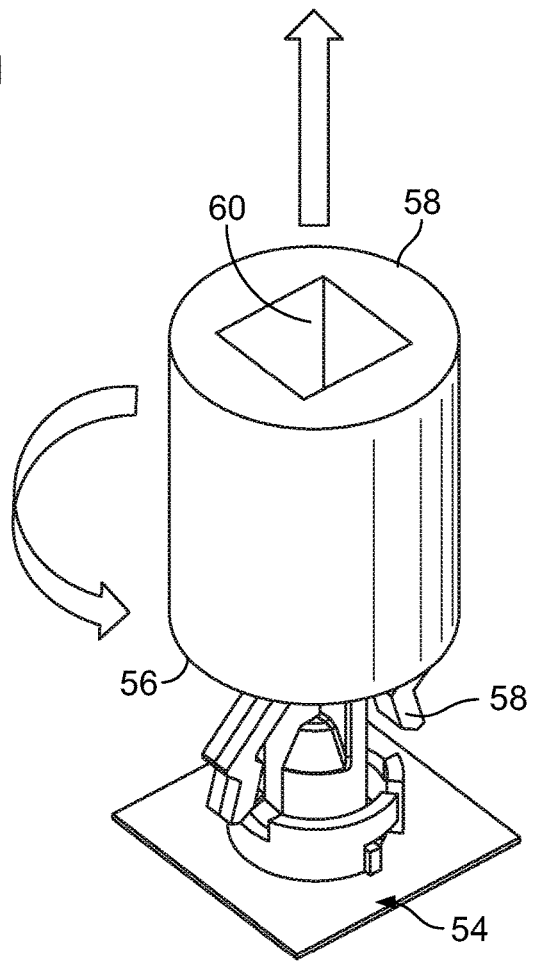

Referring now to FIGS. 4A and 4B, a pin removal tool 54 is illustrated. The pin removal tool 54 is arranged as a socket having a first end 56 and a second end 58. The second end has a fitting 60 for receiving a driving tool, which may be any conventional rotary driver. The first end 56 has a recessed opening 62. The recessed opening 62 has a cross-sectional shape corresponding to, e.g. the inverse of, a cross-sectional shape of the pin portion of a pin assembly according to the present disclosure. In this embodiment, the recessed opening 62 is generally cross-shaped, corresponding to the cross-shaped cross-section of the pin portion 24 illustrated in FIGS. 2A and 2B. However, in other embodiments the recessed opening 62 may take other shapes according to pin design.

As illustrated in FIG. 4B, the removal tool 54 may be fitted about a pin portion 64 of a pin assembly 66. The removal tool 54 may be pivoted to disengage the pin portion 64 from a base portion 68, and subsequently withdrawn to remove the pin portion 64 from the base portion 68.

Figure 5:
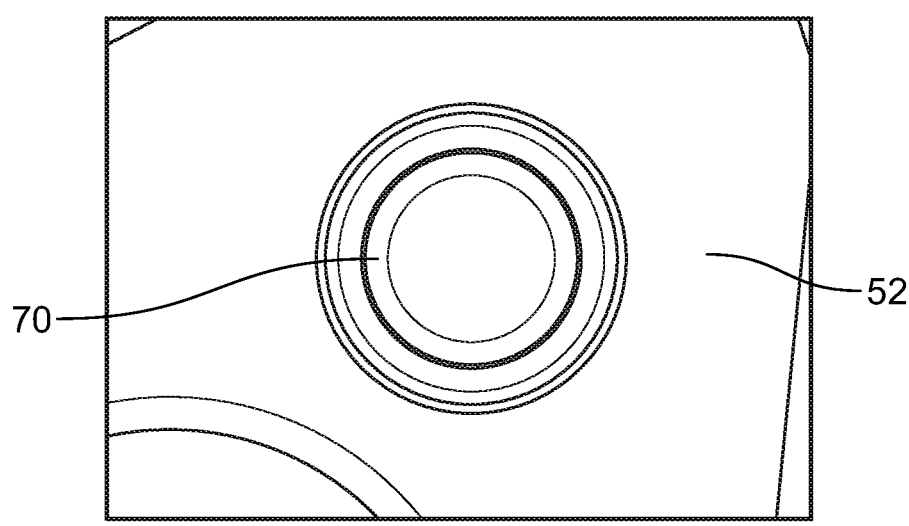
FIG. 5 is an additional view of a panel assembly according to the present disclosure.

Referring now to FIG. 5, a view of a panel assembly after pin removal is illustrated. A cap 70 is disposed to cover the aperture in the mating surface 52.

Figure 6:
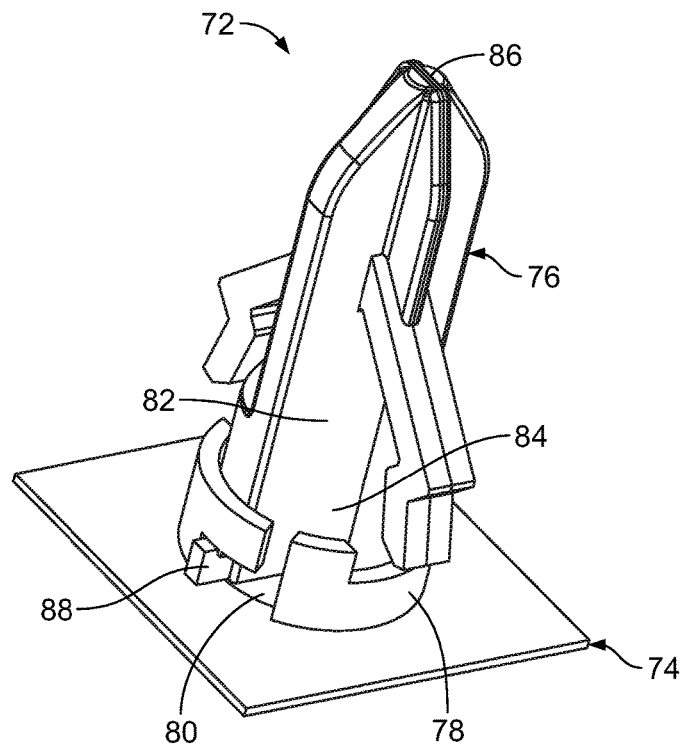
FIG. 6 is an isometric view of an alternative embodiment of a pin assembly according to the present disclosure.

Referring now to FIG. 6, an alternative embodiment of a pin assembly 72 is illustrated. The pin assembly 72 includes a base portion 74 and a pin portion 76. The base portion 74 includes a receptor 78 for receiving the pin portion 76. The receptor 78 is provided with at least one mechanical feature for engaging with the pin portion 76. In the embodiment of FIG. 6, the mechanical features include a groove 80 extending at least partially through the sidewall of the receptor 78. The groove has a first portion extending generally parallel to a central axis of the receptor 78 and a second portion extending generally circumferentially about the receptor 78.

The pin portion 76 includes an elongate body 82 extending from a proximal end 84 to a distal end 86. The proximal end 84 is provided with at least one mechanical feature for engaging with the base portion 74. In the embodiment of FIG. 6, the mechanical features include at least one tab 88 projecting outward from the body 82.

To engage the pin portion 76 and base portion 74, the tabs 88 of the pin portion 76 are aligned with the grooves 80 of the base portion 74. The pin portion 76 is inserted into the receptor 74, and subsequently pivoted. The pin portion 76 is thereby engaged with the base portion 74, as illustrated in FIG. 6.

Figure 7:
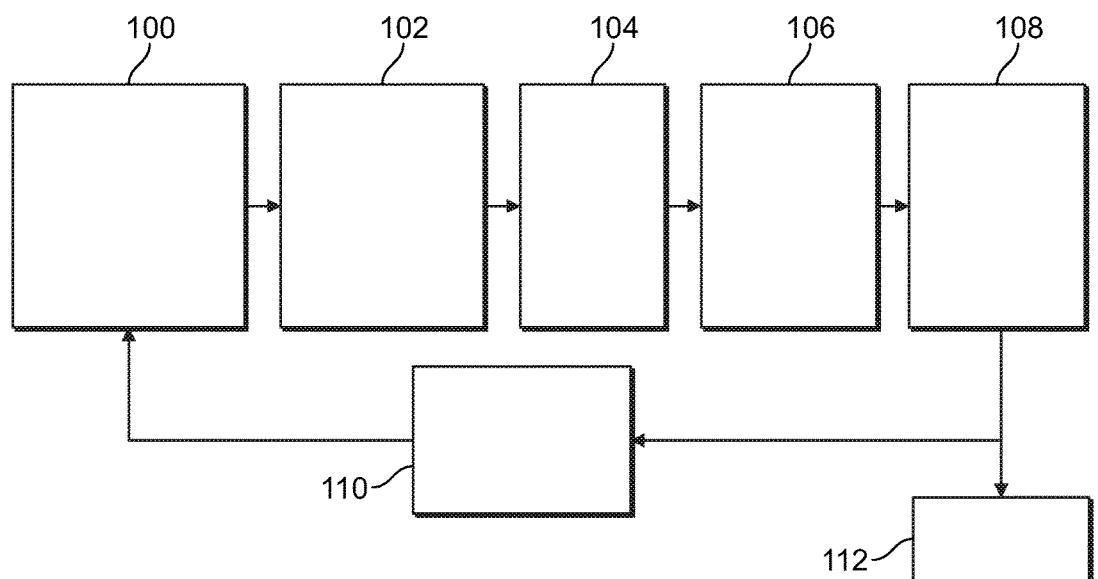
FIG. 7 is a flowchart representation of a method of assembly according to the present disclosure.

Referring now to FIG. 7, a method of assembly according to the present disclosure is illustrated in flowchart form. The method begins at block 100 with providing a panel, a locating member, and a component. The locating member has a first portion and a second portion. In an exemplary embodiment, the locating member is configured generally similar to the pin assembly of FIGS. 2A and 2B, or of FIG. 6. The component has an orifice for receiving a locating member.

The first portion is secured to the panel, e.g. by applying an adhesive between the first potion and the panel and curing the adhesive, as illustrated at block 102.

The second portion is disposed in the orifice to locate the panel in a desired position relative to the component, as illustrated at block 104.

The panel is secured to the component, e.g. by applying an adhesive between the component and the panel and curing the adhesive, as illustrated at block 106.

The second portion is disengaged from the first portion, e.g. by use of a tool as described above, as illustrated at block 108.

The second portion may be reused for a subsequent assembly, e.g. by engaging the second portion to a subsequent first portion to define a subsequent locating member, as illustrated at block 110.

A cap is then disposed over the orifice, as illustrated at block 112.

As may be seen, the present disclosure provides a system and method for assembling a panel, such as a pane of glass, to a frame component. Systems and methods according to the present disclosure enable removal and covering of a locator pin after assembly without requiring additional trim pieces, and thereby avoid locator pins being visible after assembly.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of assembly comprising:
   providing a panel;
   providing a locating member having a first portion and a second portion, the second portion being releasably engaged with the first portion;
   securing the first portion to the panel;
   providing a component having an orifice for receiving a locating member;
   disposing the second portion in the orifice to locate the panel in a desired position relative to the component;
   securing the panel to the component; and
   disengaging the second portion from the first portion.

2. The method of claim 1, wherein the panel includes a pane of window glass.

3. The method of claim 1, further comprising disposing an adhesive on the panel, wherein securing the panel to the component includes curing the adhesive.

4. The method of claim 1, wherein the first portion has a first mechanical feature and the second portion has a second mechanical feature, the second mechanical feature being engageable with the first mechanical feature to mechanically engage the second portion to the first portion, and wherein disengaging the second portion from the first portion includes mechanically disengaging the second feature from the first feature.

5. The method of claim 4, wherein the first mechanical feature includes a protrusion and the second mechanical feature includes a recess, the protrusion being engageable with the recess, and wherein mechanically disengaging the second feature from the first feature includes disengaging the protrusion from the recess.

6. The method of claim 5, wherein the second portion is an elongate portion having a long axis, the recess is oriented generally orthogonal to the long axis, and wherein disengaging the protrusion from the recess includes rotating the second portion relative to the first portion.

7. The method of claim 4, wherein the first mechanical feature includes a recess and the second mechanical feature includes a protrusion, the protrusion being engageable with the recess, and wherein mechanically disengaging the second feature from the first feature includes disengaging the protrusion from the recess.

8. The method of claim 7, wherein the second portion is an elongate portion having a long axis, the recess is oriented generally orthogonal to the long axis, and wherein disengaging the protrusion from the recess includes rotating the second portion relative to the first portion.

9. The method of claim 1, further comprising reusing the second portion by engaging the second portion to a subsequent first portion to define a subsequent locating member, couplable to a subsequent panel.

10. The method of claim 1, wherein the second portion has a first cross-sectional profile, and wherein disengaging the second portion from the first portion includes providing a tool with a socket having a second cross-sectional profile, inverse to the first cross-sectional profile, disposing the tool about the second portion, and applying a torque to the tool to rotate the second portion relative to the first portion.

11. The method of claim 1, further comprising disposing a cover on the orifice after the disengaging.

12. An assembly comprising:
    a component having a surface with a receiving orifice thereon;
    a panel disposed proximate the component; and
    a locating member having a first portion and a second portion, the first portion being secured to the panel, the second portion being disposed at least partially in the orifice, the first portion having a first mechanical feature, the second portion having a second mechanical feature, the second mechanical feature being releasably engaged with the first mechanical feature, the orifice being sized to permit the second portion to pass entirely therethrough.

13. The assembly of claim 12, wherein the panel includes a pane of window glass.

14. The assembly of claim 12, wherein the first mechanical feature includes a protrusion and the second mechanical feature includes a recess, the protrusion being engaged with the recess.

15. The assembly of claim 14, wherein the second portion is an elongate portion having a long axis, the recess is oriented generally orthogonal to the long axis, the second portion being rotatable relative to the first portion to disengage the protrusion from the recess.

16. The assembly of claim 12, wherein the first mechanical feature includes a recess and the second mechanical feature includes a protrusion, the protrusion being engaged with the recess.

17. The assembly of claim 16, wherein the second portion is an elongate portion having a long axis, the recess is oriented generally orthogonal to the long axis, the second portion being rotatable relative to the first portion to disengage the protrusion from the recess.

18. The assembly of claim 12, wherein the second portion includes at least one arm member for retaining the panel relative to the component.

19. The assembly of claim 12, wherein the first portion includes a generally planar base and the second portion is an elongate portion having a long axis, the long axis being generally orthogonal to the base.

20. An automotive vehicle comprising:
    a frame for receiving window glass, the frame having a mating surface with a receiving orifice thereon;
    a pane of window glass disposed proximate the frame; and
    a locating pin having a first portion and a second portion, the first portion being secured to the pane of window glass, the second portion being disposed at least partially in the orifice, the first portion having a first mechanical feature, the second portion having a second mechanical feature, the second mechanical feature being releasably engaged with the first mechanical feature, wherein a diameter of the orifice is greater than a diameter of the second portion at the second mechanical feature.

* * * * *